United States Patent Office 2,846,546
Patented Aug. 5, 1958

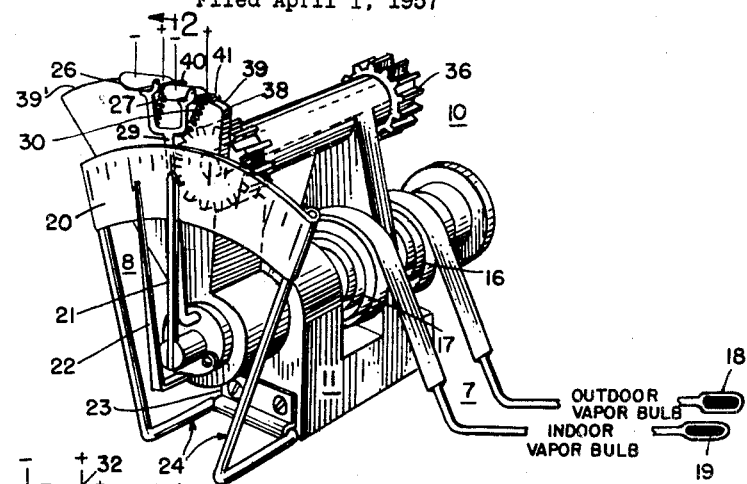
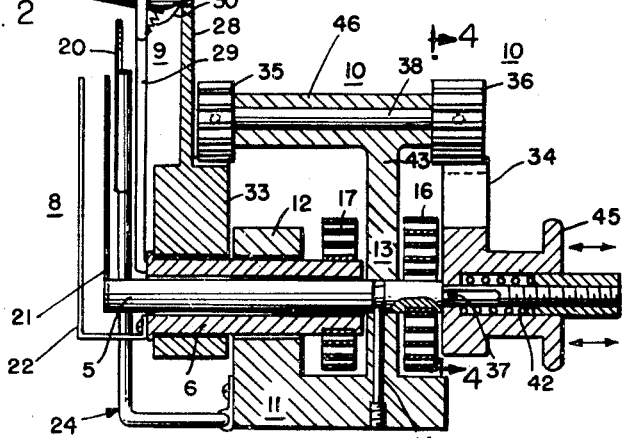
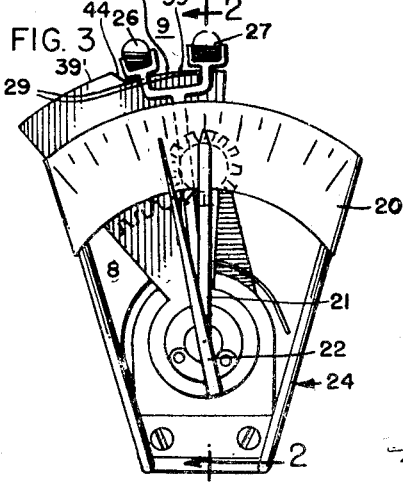
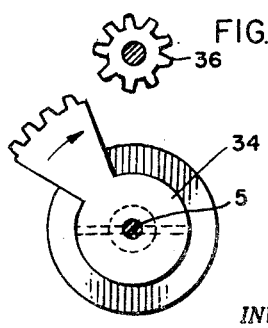

2,846,546

AIR-CONDITIONING-APPARATUS CONTROL-DEVICE

Max De Fouw, Chicago, Ill.

Application April 1, 1957, Serial No. 649,934

6 Claims. (Cl. 200—140)

This invention relates to devices for controlling the operation of air-conditioning apparatus so that a constant and predetermined temperature differential is maintained between inside and outside temperatures.

It is a well-known fact that too great a difference between inside and outside temperatures contributes to the physical discomfort, and for some persons a physical danger, when one is required to move quickly between temperatures of considerable extremes.

The main objects of this invention are to provide an improved form of device for controlling the operation of air-conditioning apparatus so as to maintain a constant and predetermined differential between inside and outside temperatures; to provide an improved device of this kind wherein the functioning of the refrigerant unit and the air-circulating unit of an air-conditioning apparatus may be separately and successively controlled; to provide an improved device of this kind with means for manually altering the degree of the predetermined differential between inside and outside temperatures; and to provide an improved device of this kind which is simple and compact in construction, hence economical to manufacture, easy to install and adjust, and highly efficacious in its functioning.

In the disclosure shown in the accompanying drawing;

Figure 1 is a more or less schematic perspective of an air-conditioning-apparatus control-device constructed in accordance with this invention;

Fig. 2 is a vertical, sectional view taken on the plane of the line 2—2 of Fig. 1;

Fig. 3 is a front, elevational view of this improved device, the line 2—2 also being the plane of the sectional view of Fig. 2; and Fig. 4 is a transverse, sectional view taken on the plane of the line 4—4 of Fig. 2.

The essential concept of this invention involves a pair of relatively-shiftable members manually settable in predetermined angular relationship and respectively actuated by temperature-sensitive means to effect the shifting of a switch mechanism controlling the operation of an air-conditioning apparatus.

An air-conditioning-apparatus control-device embodying this concept comprises a pair of concentrically-arranged shaft members 5 and 6 respectively actuated by outdoor and indoor temperature-sensitive means 7 and relatively positionable as shown by an indicator means 8 to predetermine the actuation of a switch mechanism 9 to so control the operation of an air-conditioning apparatus (not here shown) as to create and maintain a desired differential ratio between inside and outside temperatures which ratio may be altered by a manually-adjustable means 10.

The concentrically-arranged shafts 5 and 6 are supported on a base 11. The outer shaft 6 is journaled in a forward bearing 12 whereas the inner shaft 5 is journaled in the shaft 6 and in a rear bearing 13. The inner shaft 5 extends beyond both ends of the shaft 6 to permit association of both shafts with the indicator means 8 and the inner shaft 6 with adjusting means 10. A key 14 secures the inner shaft 5 against axial shifting on the support base 11.

The temperature-sensitive means 7 comprises two conventional expansible and contractible units 16 and 17 respectively actuated by vapor bulbs 18 and 19. These units 16 and 17 are connected at their ends to and coiled around the respective shafts 5 and 6 so that the expansion and contraction of the units 16 and 17 effect the opposite rotation of the respective shafts 5 and 6.

The vapor bulb 19 is adapted for location at a convenient point in the room where the air conditioning is to be effected. Similarly the bulb 18 is adapted for location at a convenient point outdoors.

The temperature-differential indicator-means 8 comprises a scale 20 and a pair of pointers 21 and 22. The scale 23 here is shown in the form of an arcuate strip of metal spanning the outer ends of the arms of a wire bracket 24 secured to and forwardly of the supporting base 11. The exposed face of the scale 20 is graduated in a conventional manner to indicate the degree of spacing of the pointers 21 and 22. The pointers 21 and 22 are suitably secured to the forward ends of the respective shafts 5 and 6 with their upper ends positioned to traverse the scale 20.

The switch mechanism 9 here is shown to comprise a pair of conventional mercury switches 26 and 27 and a cam 28. The switches 26 and 27 are hinged at the upper end of forked rod 29 attached to the forward end of the outer shaft 6 and extending radially rearward of the indicator means 8. Springs 30 normally urge the switches 26 and 27 toward their retracted, circuit-opening positions as permitted by the cam 28 and shown in Figs. 1 and 3.

The switches 26 and 27 are arranged to regulate the closing and opening of circuits 31 and 32 (Fig. 2) leading to the air-conditioning apparatus to control the starting and stopping thereof as the switches 26 and 27 are shifted out of and into their normally-retracted positions. The provision of two such switches 26 and 27 permits separate and successive control of the operation of the refrigerant unit and the air-circulating unit of the air-conditioning apparatus, as presently will be explained.

The cam 28 is an integral part of a gear 33, forming a part of the temperature-differential adjusting means 10 presently to be described. The cam 28 has its arcuate periphery divided into two circumferentially-spaced, radially-different portions 39 and 39' forming a hump 44 between them and over which the shouldered ends 40 and 41 of the respective switches 26 and 27 ride for effecting their opposite shifting to turn on and off the air-conditioning apparatus.

The temperature-differential adjusting-means 10 comprises two pairs of interconnected, meshing gears 33 and 34 and pinions 35 and 36. The gear 33 mounts the cam 28 and the gear 34 is slidably mounted on the rear, exposed end of the shaft 5. The pinions 35 and 36 are fixed to the opposite ends of a jack shaft 38 journaled on a bearing 46.

The gear 33 is journaled to freely rotate on the forward end of the shaft 6 outwardly of the support bearing 12. Integrated with this gear 33 is the sector-shaped cam 28. The gear 34 is of segment form and slidably keyed, by a pin and slot 37, on the rearward exposed end of the shaft 5 and mounting an integral finger-knob 45. A spring 42 normally urges the gear 34 into the same vertical plane with the pinion 36 but permits the retraction of the segment gear 34 to adjust its angular relationship to the pinion 36 to alter the temperature differential that may be obtained by the operation of this device. The pinions 35 and 36 are fixed at the opposite ends of the jack-shaft 38 which is journaled on a bearing integral with the supporting base 11.

The several parts here are shown much enlarged so as to make clear their relative forms and arrangements. In the actual construction, these parts are of a miniature character so that the device, encased in a suitable housing, may be mounted on a wall, and would be very inconspicuous. Obviously, of this assembly only the scale 20 and the traversing ends of the pointers 21 and 22 would be visible through a transparent panel in the housing.

The gear 34 is so set on the shaft 5 that the gear is out of operative meshing relationship with the pinion 36 (as shown in the figures) when the outside temperature is a certain number of degrees above the desired optimum inside temperature. Say the latter is 72 degrees and the former is 82 degrees; thus providing for a ten degree differential between inside and outside temperature. This device is designed to maintain that differential whenever the outside temperature exceeds 82 degrees.

So long as the outside temperature is 82 degrees or less, the gear 34 will be out of operative meshing relationship with the pinion 36, as shown in Fig. 4. Any drop in the outside temperature below 82 degrees will result in the gear 34 being moved further counter-clockwise and hence being more out of operative meshing relationship with the pinion 36. Accordingly, there will never be any movement of the cam 28. It will remain stationary no matter what may be the changes in inside temperature either above or below the desired 72 degree optimum. Under such conditions, the switches 26 and 27 will be on the low part 39 of the cam 28 and the air conditioning apparatus will be idle.

Assume, now, that the inside temperature is at 72 degrees and the outside temperature begins to rise, to first approach 82 degrees and then pass that amount. As the outside temperature approaches 82 degrees the gear 34 will move in a clockwise direction (Fig. 4) and approach operative meshing relationship with the pinion 36. Any rise of the outside temperature above 82 degrees will initiate a counter-clockwise movement of the pinion 36.

Movement of the pinion 36 counter-clockwise will result in a movement of the gear 33 clockwise, hence a movement of the cam 28 clockwise (Figs. 1 and 3). If at that time the inside temperature is 72 degrees or above, the clockwise movement of the cam 28 will cause first one and then the other of the switches 26 and 27 to ride up over the hump 44 on the cam 28 and successively cut in first the air-circulating unit and then the refrigerating unit of the air-conditioning apparatus.

So long as the outside temperature remains 82 or more degrees, and the inside temperature is less than the desired ten degree differential, i. e. about 72 degrees, the air conditioning apparatus will continue to operate. If, as a result of the air conditioning operation, the inside temperature begins to drop below the assumed ten degree differential, the shaft 6, under the influence of the temperature-sensitive coil 17, will be given a counter-clockwise movement and cause the forked rod 29 to move counter-clockwise. This will shift the switches 26 and 27 up over the hump 44 of the cam 28 and successively cut off, first the refrigerating unit and then the air-circulating unit of the air-conditioning apparatus. Thereupon the air-conditioning apparatus will remain idle, until the inside temperature again rises above the desired 72 degree optimum. If such rise in inside temperature does occur it will cause a clockwise turning of the shaft 6 and hence a similar movement of the forked rod 29 to move the switches 27 and 26 successively down the hump 44 of the cam 28 to the low part 39. Thereupon the air conditioning apparatus will again be put into operation as hereinbefore explained.

When the outside temperature begins to recede from a point above 82 degrees, the shaft 5 is turned counter-clockwise by the temperature-sensitive coil 16. Consequently, the gear 34 is moved in the same direction to a point where it recedes from operative meshing relationship with the pinion 36. Simultaneously, the cam 28 is moved counter-clockwise until the hump 44 of the cam 28 passes the switches 26 and 27 and the air conditioning apparatus is cut off as previously explained.

Although but two specific embodiments of this invention are herein shown and described, it will be understood that details of the construction shown may be altered or omitted without departing from the spirit of the invention as defined by the following claims.

I claim:

1. An air-conditioning-apparatus control-device comprising, a pair of concentrically-arranged shaft members, temperature-sensitive means connected to effect the relative rotation of the respective shaft members, switch mechanism for controlling the operation of the air-conditioning-apparatus, means on the respective shaft members connected to effect the opposite shifting of the switch mechanism to start and stop the operation of the air-conditioning-apparatus, and manually-settable means on the respective shaft members for fixing the rotative disposition thereof for predetermining the relative temperature conditions at which the switch mechanism is actuated to control the operation of the air-conditioning-apparatus.

2. An air-conditioning-apparatus control-device comprising, a pair of concentrically-arranged shaft members, temperature-sensitive means connected to effect the relative rotation of the respective shaft members, switch mechanism for controlling the operation of the air-conditioning-apparatus, means on the respective shaft members connected to effect the opposite shifting of the switch mechanism to start and stop the operation of the air-conditioning-apparatus, manually-settable means fixing the rotative disposition of the shaft members for predetermining the relative temperature conditions at which the switch mechanism is actuated to control the operation of the air-conditioning apparatus, a pointer connected to each shaft member and extending radially thereof, and a scale juxtaposed to the outer ends of the pointers to indicate the relative rotative disposition of the shaft members.

3. An air-conditioning-apparatus control-device comprising, a supporting base, a pair of shaft members concentrically journaled on the base with the ends of one shaft extending beyond the ends of the other shaft, an outside-temperature-controlled temperature-sensitive means connected to effect an opposite rotation of the shaft member, an inside-temperature-controlled temperature-sensitive means connected to effect the opposite rotation of the other shaft, a cam rotatively mounted on the base, a gear connected to actuate the cam, a second gear connected to rotate with the one shaft, pinions journaled on the base and connected to synchronize the movement of the gears, switch mechanism positioned for opposite shifting by the cam to control the operation of the air-conditioning apparatus, and means mounting the switch mechanism and connected to move in unison with the other shaft member.

4. An air-conditioning-apparatus control-device comprising, a supporting base, a pair of shaft members concentrically journaled on the base with the ends of one shaft extending beyond the ends of the other shaft, an outside-temperature-controlled temperature-sensitive means connected to effect an opposite rotation of the one shaft member, an inside-temperature-controlled temperature-sensitive means connected to effect the opposite rotation of the other shaft, a cam rotatively mounted on the base, a gear connected to actuate the cam, a second gear connected to rotate with the one shaft, pinions journaled on the base and connected to synchronize the movement of the gears, switch mechanism positioned for opposite shifting by the cam to control the operation of the air-conditioning apparatus, means mounting the switch mechanism and connected to move in unison with the other shaft member, and means for manually altering the angular disposition of the second gear with respect to the pinions for fixing the rotative disposition of the shaft members for predetermining the relative temperature conditions at which the switch mechanism is actuated to control the operation of the air-conditioning apparatus.

5. An air-conditioning-apparatus control-device comprising, a supporting base, a pair of shaft members concentrically journaled on the base with the ends of one shaft extending beyond the ends of the other shaft, an outside-temperature-controlled temperature-sensitive means connected to effect an opposite rotation of the one shaft member, an inside-temperature-controlled temperature-sensitive means connected to effect the opposite rotation of the other shaft, a cam rotatively mounted on the base, a gear connected to actuate the cam, a second gear connected to rotate with the one shaft, pinions journaled on the base and connected to synchronize the movement of the gears, switch mechanism positioned for opposite shifting by the cam to control the operation of the air-conditioning apparatus, means mounting the switch mechanism and connected to move in unison with the other shaft member, means for manually altering the angular disposition of the second gear with respect to the pinions for fixing the rotative disposition of the shaft members for predetermining the relative temperature conditions at which the switch mechanism is actuated to control the operation of the air-conditioning apparatus, a pointer connected to each shaft and extending radially thereof, and a scale secured to the base and juxtaposed to the outer ends of the pointers to indicate the fixed relative disposition of the shaft members.

6. An air-conditioning-apparatus control-device comprising, a supporting base, a pair of shaft members concentrically journaled on the base with the ends of one shaft extending beyond the ends of the other shaft, an outside-temperature-controlled temperature-sensitive means connected to effect an opposite rotation of the one shaft member, an inside-temperature-controlled temperature-sensitive means connected to effect the opposite rotation of the other shaft, a cam rotatively mounted on the base, a gear connected to actuate the cam, a second gear splined to rotate with the one shaft, pinions journaled on the base and connected to synchronize the movement of the gears, resilient means normally urging the second gear into mesh with one of the pinions, switch mechanism positioned for opposite shifting by the cam to control the operation of the air-conditioning apparatus, means mounting the switch mechanism and connected to move in unison with the other shaft member, and a hand knob on the second gear to permit its manual retraction on the one shaft for adjusting its angular relationship with the pinion to alter the predetermined temperature conditions at which the switch mechanism is actuated to control the operation of the air-conditioning apparatus.

References Cited in the file of this patent

UNITED STATES PATENTS

| 2,249,418 | Chambers | July 15, 1941 |
| 2,431,801 | Gibson | Dec. 2, 1947 |
| 2,536,831 | Allan | Jan. 2, 1951 |
| 2,556,582 | Hansen | June 12, 1951 |
| 2,651,691 | Coblentz | Sept. 8, 1953 |
| 2,744,848 | Tidd | Dec. 18, 1956 |